United States Patent [19]
Kobayashi

[11] Patent Number: 6,125,002
[45] Date of Patent: *Sep. 26, 2000

[54] RECORDING AND/OR REPRODUCING APPARATUS PROVIDED WITH ROTATABLE AND SLIDABLE REEL BRAKING DEVICE

[75] Inventor: Junji Kobayashi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/880,379

[22] Filed: Jun. 23, 1997

[51] Int. Cl.⁷ ...................................................... G11B 17/00
[52] U.S. Cl. ............................................................ 360/96.3
[58] Field of Search ................. 360/83, 96.3; 242/343.2, 242/338.1, 355, 355.1, 355.2

[56] References Cited

U.S. PATENT DOCUMENTS

| | | |
|---|---|---|
| 3,857,633 | 12/1974 | Easterly et al. .......................... 352/124 |
| 4,917,328 | 4/1990 | Kobayashi et al. ..................... 360/96.3 |
| 5,150,265 | 9/1992 | Tanaka .................................... 360/96.3 |
| 5,299,076 | 3/1994 | Park ........................................ 360/96.3 |
| 5,774,300 | 6/1998 | Eum .......................................... 360/85 |

*Primary Examiner*—David Davis
*Attorney, Agent, or Firm*—Robin, Blecker & Daley

[57] ABSTRACT

A reel braking device comprises a brake member integrally provided with an abutting contact portion and an engaging portion, and an urging member. The abutting contact portion has an approximately circular arc form and is capable of coming into abutting contact with a sliding portion of an outer periphery of a reel mount, and the engaging portion is capable of engaging with an engaged portion of the outer periphery of the reel mount. The brake member is arranged to be rotatable around near the center of the approximately circular arc form of the abutting contact portion and movable toward the reel mount. The urging member is provided separately from the brake member and is arranged to urge the brake member so as to move the brake member toward the reel mount.

17 Claims, 5 Drawing Sheets

RECORDING AND/OR REPRODUCING APPARATUS PROVIDED WITH ROTATABLE AND SLIDABLE REEL BRAKING DEVICE

BACKGROUND OF THE INVENTION

1. Field of the Invention

The present invention relates to a reel braking device for use in VTRs (video tape recorders), etc., and to a recording and/or reproducing apparatus, such as a VTR, provided with the reel braking device.

2. Description of Related Art

Figure 5A:
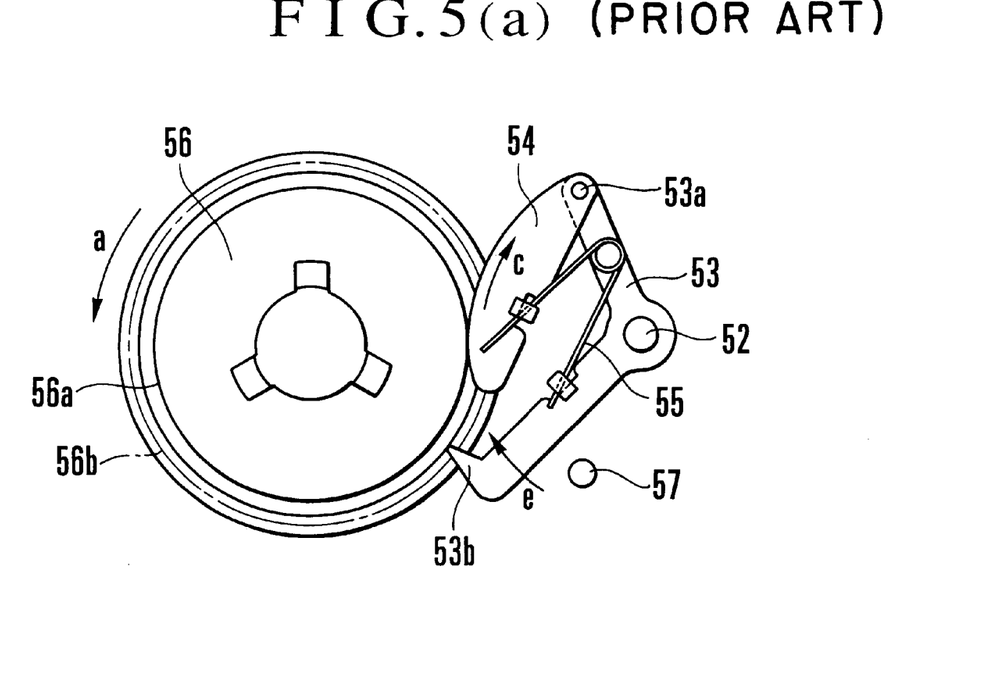
FIG. 5(a) is a plan view of the conventional reel braking device in a brake actuated state and FIG. 5(b) is a plan view thereof in a brake released state.
Figure 5B:
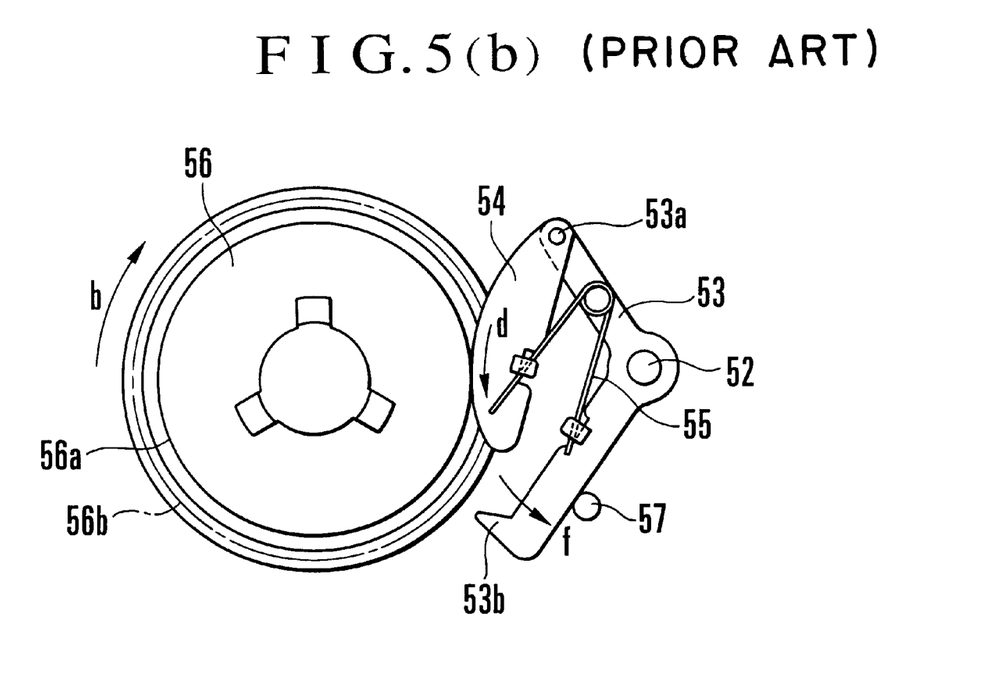
Figure 6:
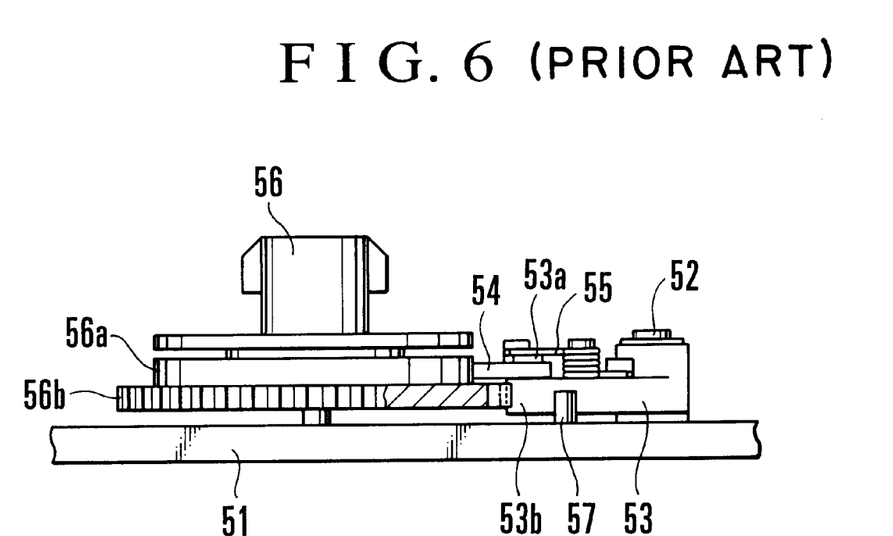
FIG. 6 is a side view of the conventional reel braking device.

In the field of VTRs, for example, there has been heretofore known a reel braking device which constitutes a one-way clutch for a reel mount on which a reel is mounted, as illustrated in FIGS. 5(a) and 5(b) and FIG. 6.

Referring to FIGS. 5(a) and 5(b) and FIG. 6, a brake lever 53 is rotatably supported by a shaft 52 vertically provided on a chassis 51, and a sub-lever 54 is provided to be rotatable about a shaft 53a on the brake lever 53. The sub-lever 54 is urged to rotate in the counterclockwise direction about the shaft 53a by a spring 55 which is interposed between the sub-lever 54 and the brake lever 53. Then, the sub-lever 54 is able to be in abutting contact with a cylindrical portion (surface) 56a of an outer periphery of a reel mount 56 rotatably installed on the chassis 51, and a pawl portion 53b of the brake lever 53 is engageable with a gear portion 56b of the reel mount 56.

In the above construction, as shown in FIG. 5(a), when the reel mount 56 is rotated in the direction of an arrow "a", the sub-lever 54 is driven to turn in the direction of an arrow "c" due to friction produced between itself and the cylindrical portion 56a, causing the brake lever 53 to rotate in the direction of an arrow "e". This brings the pawl portion 53b of the brake lever 53 into engagement with the gear portion 56b of the reel mount 56, so that the gear portion 56b stops rotation and is kept fixed.

Conversely, as shown in FIG. 5(b), when the reel mount 56 is rotated in the direction of an arrow "b", the sub-lever 54 is driven to turn in the direction of an arrow "d", causing the brake lever 53 to rotate in the direction of an arrow "f". This makes the pawl portion 53b to be disengaged from the gear portion 56b, so that the gear portion 56b is free to rotate. Incidentally, the brake lever 53 is stopped by abutting on a stopper 57 disposed on the chassis 51.

The conventional reel braking device described above, however, requires at least three parts, i.e., the brake lever 53, the sub-lever 54 and the spring 55. Therefore, the conventional reel braking device has had problems that the number of parts is large, the efficiency of assembly is poor, and the cost is high.

It may be conceivable that the sub-lever 54 is formed integrally with the brake lever 53 by simultaneous molding, while the sub-lever 54 is given resiliency enough to hold it always in pressure contact with the cylindrical portion 56a of the reel mount 56. However, such a construction accompanies problems in that, because the lever has to develop resiliency in itself, selection of appropriate molding materials is subject to limitations and the resiliency cannot be always held constant because of molding error or secular variation. Thus, the braking operation would tend to become unstable.

BRIEF SUMMARY OF THE INVENTION

It is an object of the present invention to provide a reel braking device capable of ensuring stable braking operation with a reduced number of parts, and a recording and/or reproducing apparatus provided with the reel braking device.

To achieve the above object, in accordance with an aspect of the present invention, there is provided a reel braking device, which comprises a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount, the brake member being arranged to be rotatable around near the center of the approximately circular arc form of the abutting contact portion and movable toward the reel mount, and an urging member provided separately from the brake member and arranged to urge the brake member so as to move the brake member toward the reel mount.

Further, in accordance with another aspect of the present invention, there is provided a reel braking device, which comprises a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount, and a guide slot formed near the center of the approximately circular arc form of the abutting contact portion and extending approximately toward the middle of the abutting contact portion, the guide slot of the brake member being engaged with and supported by a guide shaft provided on a chassis on which the reel mount is disposed, so that the brake member is arranged to be rotatable on the chassis and movable toward the reel mount, and an urging member provided separately from the brake member and arranged to urge the brake member so as to move the brake member toward the reel mount, the urging member being extended between the brake member and the guide shaft.

Further, in accordance with a further aspect of the present invention, there is provided a recording and/or reproducing apparatus, which comprises the above-stated reel braking device, a rotary drum having a head for recording and/or reproduction, tape loading means for pulling a tape out of a cassette, a first chassis on which at least the rotary drum is disposed, and a second chassis on which at least the reel mount and the brake member are disposed and which is arranged to be slidable relatively with respect to the first chassis, wherein, after the cassette is mounted on the reel mount on the second chassis, the second chassis is slid toward the rotary drum relatively with respect to the first chassis, and the tape is pulled out of the cassette by the tape loading means so that the tape is loaded onto a predetermined path including a circumferential surface of the rotary drum.

The above and further objects and features of the present invention will be apparent from the following detailed description of the preferred embodiment thereof with reference to the accompanying drawings.

BRIEF DESCRIPTION OF THE SEVERAL VIEWS OF THE DRAWING

FIGS. 1(a) and 1(b) illustrate a reel braking device according to an embodiment of the present invention, in which

FIGS. 5(a) and 5(b) illustrate a conventional reel braking device in which

DETAILED DESCRIPTION OF THE INVENTION

Hereinafter, a preferred embodiment of the present invention will be described in detail with reference to FIGS. 1(a) and 1(b) through FIG. 4. The general construction of the entirety of a VTR according to the embodiment of the present invention is first described referring to FIGS. 3 and 4.

Figure 3:
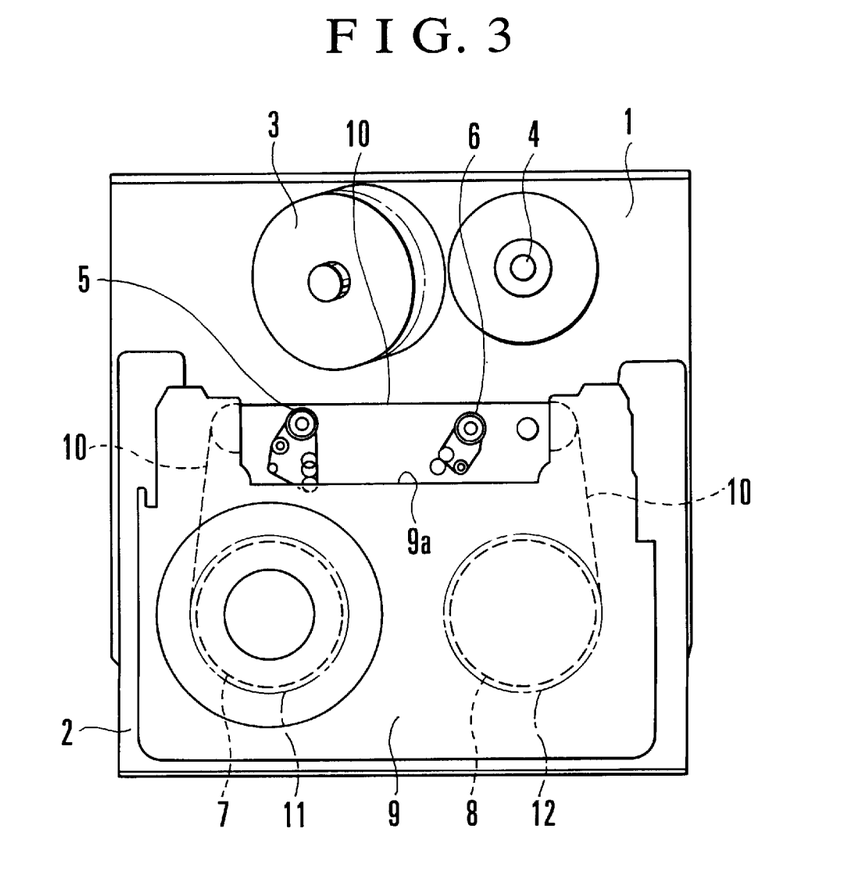
FIG. 3 is a schematic plan view of a VTR, in an unloaded state, according to the embodiment of the present invention.
Figure 4:
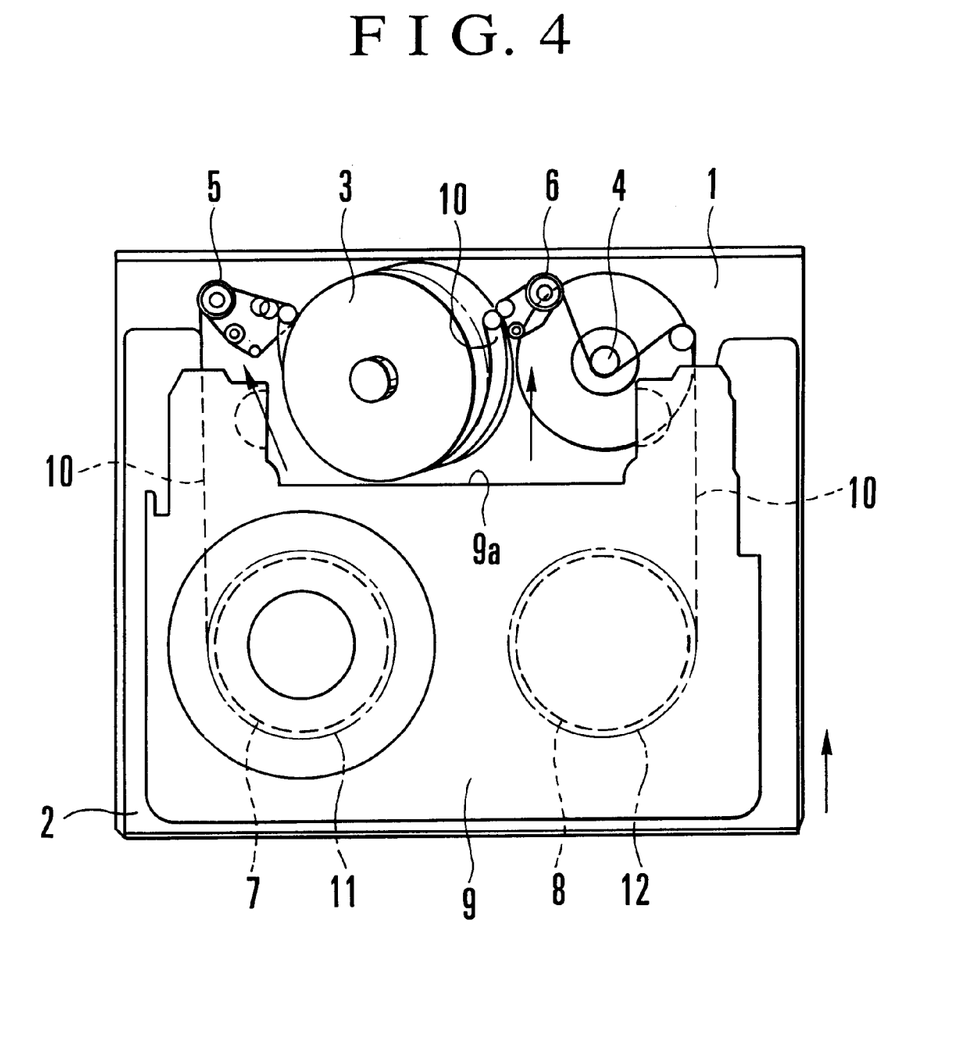
FIG. 4 is a schematic plan view of the VTR in a loading completed state.

Reference numeral 1 denotes a main chassis as a first chassis, and reference numeral 2 denotes a slide chassis as a second chassis. The slide chassis 2 is arranged to be slidable on the main chassis 1. A rotary drum 3 is disposed on the main chassis 1 and is equipped with a magnetic head for recording and/or reproduction. Reference numeral 4 denotes a capstan protruding on the main chassis 1, reference numerals 5 and 6 denote tape guide members of a tape loading means, and reference numerals 7 and 8 denote a pair of reel mounts disposed on the slide chassis 2. A cassette 9 houses therein a pair of reels 11 and 12 around which a magnetic tape 10 is wound.

The VTR thus constructed performs a recording and/or reproducing operation as follows. First, as shown in FIG. 3, the cassette 9 is mounted on the slide chassis 2 such that the reels 11 and 12 are fitted over the reel mounts 7 and 8, respectively. Then, the slide chassis 2 is slidably moved toward the rotary drum 3 relatively with respect to the main chassis 1, and a tape 10 is pulled of an opening 9a of the cassette 9 by the tape guide members 5 and 6. Finally, as shown in FIG. 4, at least a part of the rotary drum 3 is relatively inserted into the opening 9a of the cassette 9, and the tape 10 is loaded on a predetermined path including a circumferential surface of the rotary drum 3. In this condition, the tape 10 is brought into pressing contact with the capstan 4 by a pinch roller (not shown). The tape 10 is then advanced so as to perform a desired recording and/or reproduction operation by means of the head of the rotary drum 3.

Figure 1A:
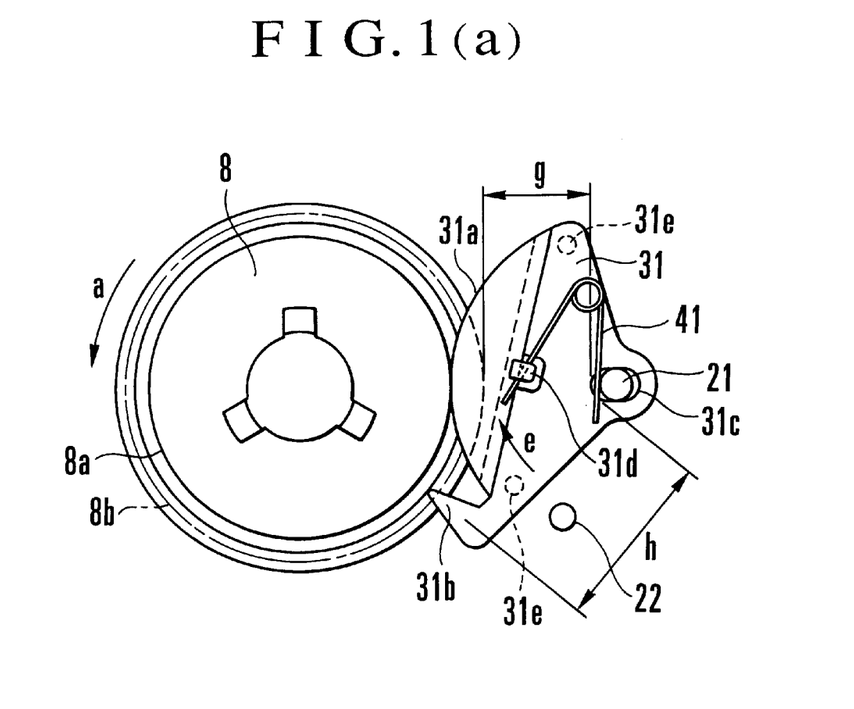
FIG. 1(a) is a plan view of the reel braking device in a brake actuated state and FIG. 1(b) is a plan view thereof in a brake released state.
Figure 1B:
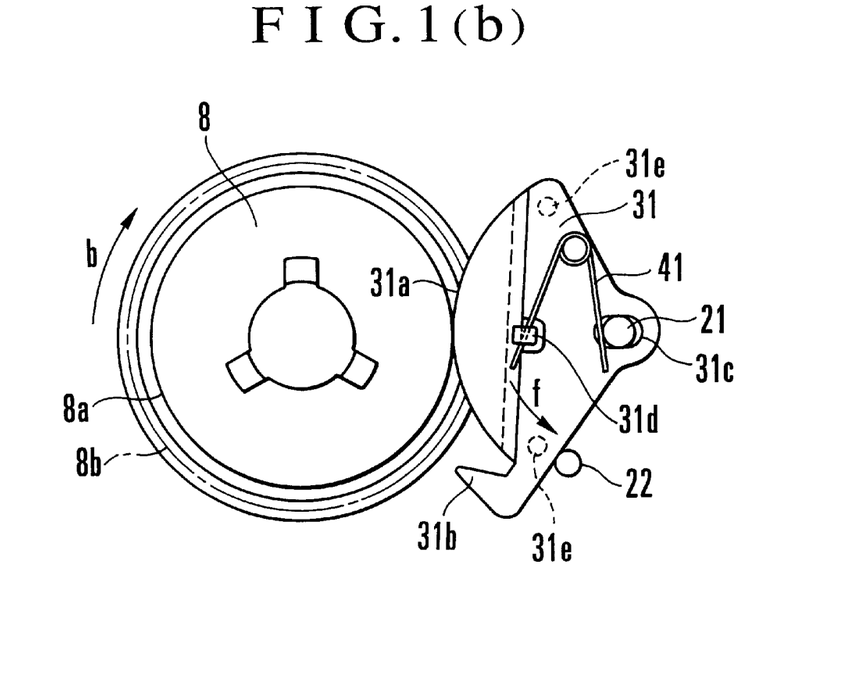

Next, a reel braking device in the above VTR according to the embodiment of the present invention will be described. FIGS. 1(a) and 1(b) are each a plan view of the reel braking device, FIG. 1(a) showing a brake actuated state and FIG. 1(b) showing a brake released state, and FIG. 2 is a side view of the reel braking device.

Figure 2:
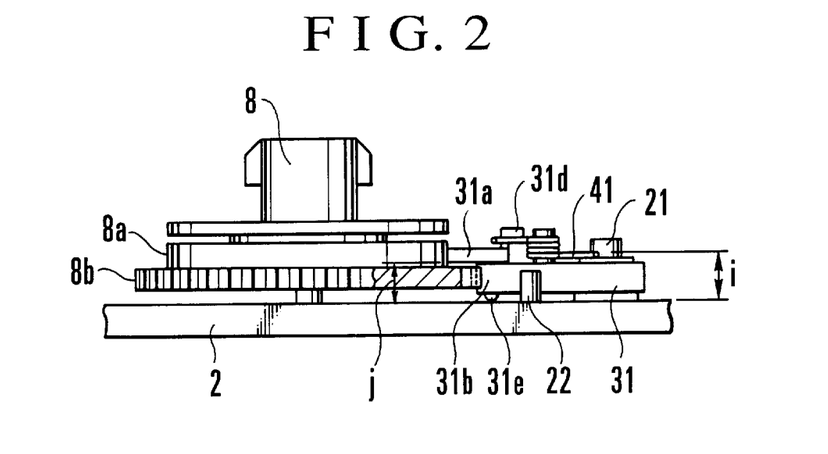
FIG. 2 is a side view of the reel braking device.

Referring to FIGS. 1(a), 1(b) and 2, reference numeral 2 denotes a chassis and reference numeral 8 denotes a reel mount which is rotatably disposed on the chassis 2. The chassis 2 and the reel mount 8 correspond respectively to the slide chassis 2 and the reel mount 8 on the reel-up side in the above-mentioned VTR. At an outer periphery of the reel mount 8, there are formed a cylindrical portion 8a as a sliding portion and a gear portion 8b as an engaged portion.

Reference numeral 31 denotes a brake member which is provided with an abutting contact portion 31a having an approximately circular arc form and capable of coming into abutting contact with the cylindrical portion 8a of the reel mount 8, and a pawl portion 31b as an engaging portion capable of engaging with the gear portion 8b of the reel mount 8. The brake member 31 is formed of, e.g., synthetic resin, but is not especially required to have a portion developing resiliency in itself. Thus, the entirety of the brake member 31 is integrally formed as a one-piece rigid part by simultaneous molding. A guide slot 31c is also formed as a support base portion in the brake member 31. The guide slot 31c is formed near the center of the approximately circular arc form of the abutting contact portion 31a and is a long hole extending approximately toward the middle of the abutting contact portion 31a.

The guide slot 31c is engaged with a guide shaft 21 vertically provided on the chassis 2, so that the brake member 31 is arranged to be rotatable about the guide slot 31c as a fulcrum and to be slidable toward the reel mount 8. Further, a pressure contact spring 41 as an urging member is extended between a catch 31d formed on the brake member 31 and the guide shaft 21, thereby urging the brake member 31 to move in such a direction as to come into abutting contact with the reel mount 8. The pressure contact spring 41 is preferably a metal spring. Additionally, the brake member 31 is able to abut on a stopper 22 provided on the chassis 2.

In FIGS. 1(a) and 1(b), in order to make the pressure contact spring 41 always develop resilient force in the state where the abutting contact portion 31a of the brake member 31 is in abutting contact with the cylindrical portion 8a of the reel mount 8, some clearance is required between the right edge of the guide slot 31c and the guide shaft 21. On the other hand, in order to make the pawl portion 31b of the brake member 31 engageable with the gear portion 8b of the reel mount 8, it is required that even in the state where the brake member 31 is slid in the direction away from the reel mount 8 and the left edge of the guide slot 31c abuts on the guide shaft 21, a distance "g" from the abutting point (or the left edge of the guide slot 31c) to the gear portion 8b is shorter than a distance "h" from the abutting point to the pawl portion 31b (i.e., g<h). Thus, an amount by which the brake member 31 is slidable is appropriately restricted by the length of the guide slot 31c engaging with the guide shaft 21.

Further, as shown in FIG. 2, assuming that the height of a position above the chassis 2 where one end of the pressure contact spring 41 abuts on the guide shaft 21 is "i" and the height of a position above the chassis 2 where the abutting contact portion 31a of the brake member 31 is brought into abutting contact with the cylindrical portion 8a of the reel mount 8 is "j", the heights "i" and "j" are set to meet "i≦j", i.e., the height "i" is equal to or greater than the height "j". This setting enables the pressure contact spring 41 to develop an urging force to push the abutting contact portion 31a of the brake member 31 downward while pushing it toward the cylindrical portion 8a of the reel mount 8. Therefore, wobbling movement of the brake member 31 caused by a fitting play between the guide slot 31c and the guide shaft 21 is eliminated and the brake member 31 is always biased toward the chassis 2 to be held in a stable state. In the illustrated embodiment, particularly, a pair of spherical bosses 31e are formed on the underside of the brake member 31, and the height of the bosses 31e is selected such that when the bosses 31e abut on the chassis 2 under the urging force of the pressure contact spring 41, the abutting contact portion 31a and the pawl portion 31b lie respectively at the same level as the cylindrical portion 8a and the gear portion 8b. Thus, the bosses 31e serve to not only properly position the brake member 31 in the direction of height, but also reduce friction between the brake member 31 and the chassis 2. In the above construction, setting the heights "i" and "j" to meet "i<j" results in a better advantage because the downward urging force is surely applied to the abutting contact portion 31a. However, the technical concept of the present invention also involves a construction wherein the heights "i" and "j" are essentially of the same order to such an extent that an upward urging force will not be developed.

The reel braking device constructed as explained above operates below. With the abutting contact portion 31a of the brake member 31 held in pressing contact with the cylindrical portion 8a of the reel mount 8, as shown in FIG. 1(a), when the reel mount 8 is rotated in the direction of an arrow "a", the brake member 31 is caused to turn in the direction of an arrow "e" about the guide slot 31c due to the frictional force produced between the cylindrical portion 8a and the abutting contact portion 31a. This turning motion brings the pawl portion 31b of the brake member 31 into engagement with the gear portion 8b of the reel mount 8, so that the gear portion 8b stops rotation and is kept fixed. In this state, even if the reel mount 8 is going to further rotate with strong torque, the brake member 31 is positively stopped when the left edge of the guide slot 31c abuts on the guide shaft 21. At this time, because of "g<h" as mentioned above, the pawl portion 31b will never disengage from the gear portion 8b and the gear portion 8b is reliably kept fixed.

As shown in FIG. 1(b), when the reel mount 8 is rotated in the direction of an arrow "b", the brake member 31 is caused to turn in the direction of an arrow "f" under a similar action of the frictional force as in the above case. This turning motion makes the pawl portion 31b disengaged from the gear portion 8b, so that the gear portion 8b is free to rotate. At this time, the brake member 31 is stopped by abutting on the stopper 22 provided on the chassis 2. However, since the brake member 31 is allowed to slide owing to the guide slot 31c, the pressure contact force between the brake member 31 and the cylindrical portion 8a of the reel mount 8 is prevented from increasing excessively.

As described above, because the brake member 31 is urged by the pressure contact spring 41 to move toward the reel mount 8 in a rotatable and slidable manner, the abutting contact portion 31a of the brake member 31 can be always reliably held in abutting contact with the cylindrical portion 8a of the reel mount 8 under virtual resilient force, although the brake member 31 is a onepiece rigid part. Further, when the reel mount 8 is rotated, the pawl portion 31b of the brake member 31 can be surely engaged with or disengaged from the gear portion 8b.

While the preferred embodiment of the present invention has been described above, the present invention is not limited to the illustrated embodiment, but can be modified in various ways and put into practice in various application forms based on the technical concept of the invention. For example, in the reel braking device according to the illustrated embodiment, the guide slot formed in the brake member is engaged with the guide shaft provided on the chassis. However, the structure may be modified such that a guide shaft is provided on the brake member and engaged in a guide slot formed in the chassis. Also, in the VTR according to the illustrated embodiment, the slide chassis on which the reel mount and the brake member are disposed is slidably moved with respect to the main chassis. However, the present invention is also applicable to a general recording and/or reproducing apparatus wherein the reel mount and the brake member are disposed on a fixed chassis along with the rotary drum and so forth.

According to the embodiment of the present invention, as described above, a brake member integrally provided with an abutting contact portion and an engaging portion for a reel mount is arranged to be rotatable and movable toward the reel mount, and the brake member is urged by a separate urging member to move toward the reel mount. Therefore, the brake member can be entirely formed into a one-piece part, and the separate urging member can be disposed directly between the brake member and the chassis, for example. It is hence possible to reduce the number of parts, increase the efficiency of assembly, and cut down the cost. Further, since the brake member can be formed as a rigid part in its entirety, materials of the brake member can be selected free from any limitations. Additionally, by utilizing constant pressure force developed by the separate urging member such as a metal spring, a stable braking operation can be achieved without deterioration of resilient force due to molding error or secular variation.

What is claimed is:

1. A reel braking device comprising:
   (a) a brake member unitarily formed with a contact portion having an approximately circular arc form and capable of contacting with a portion of an outer periphery of a reel mount, and an engaging portion capable of engaging with an engaged portion of the outer periphery of the reel mount,
      said brake member being arranged to be rotatably supported around a shaft fixed near the center of the approximately circular arc form of said contact portion and to be shiftable toward the reel mount in a direction which said brake member contacts said contact portion to said portion of the outer periphery of the reel mount or separates said contact portion from said portion of the outer periphery of the reel mount; and
   (b) an urging member arranged to urge said brake member so as to move said brake member toward the reel mount.

2. A reel braking device according to claim 1, wherein, on a chassis on which the reel mount is disposed, said brake member is supported through engagement so as to be rotatable and movable toward the reel mount.

3. A reel braking device according to claim 2, wherein said brake member is placed between said urging member and the chassis.

4. A recording and/or reproducing apparatus comprising said reel braking device according to claim 1, a rotary drum having a head f or recording and/or reproduction, tape loading means for pulling a tape out of a cassette, a first chassis on which at least said rotary drum is disposed, and a second chassis on which at least the reel mount and said brake member are disposed and which is arranged to be slidable relatively with respect to said first chassis,
   wherein, after the cassette is mounted on the reel mount on said second chassis, said second chassis is slid toward said rotary drum relatively with respect to said first chassis, and the tape is pulled out of the cassette by said tape loading means so that the tape is loaded onto a predetermined path including a circumferential surface of said rotary drum.

5. A reel braking device according to claim 1, wherein the sliding portion and the engaged portion of the outer periphery of the reel mount are a cylindrical portion and a gear portion, respectively, and said engaging portion of said brake member is a pawl portion.

6. A reel braking device comprising:
   (a) a brake member unitarily formed with a contact portion having an approximately circular arc form and capable of contacting with a portion of an outer periphery of a reel mount, an engaging portion capable of engaging with an engaged portion of the outer periphery of the reel mount, and a guide slot formed near the center of the approximately circular arc form of said abutting contact portion and approximately extending in a direction to said reel mount, said guide slot of said brake member being engaged with a guide shaft provided on a chassis on which the reel mount is disposed, so that said brake member is arranged to be rotatable on the chassis and slidably supported in a direction which said brake member contacts said contact portion to said portion of the outer periphery of the reel mount or separates said contact portion from said portion of the outer periphery of the reel mount; and (b) an urging member arranged to urge said brake member so as to move said brake member toward the reel mount, said urging member being extended between said brake member and said guide shaft.

7. A reel braking device according to claim 6, wherein an amount by which said brake member is allowed to move is set such that, even when said brake member is moved in a direction away from the reel mount and an edge of said guide slot abuts on said guide shaft, a first distance from the abutting point to the engaged portion of the outer periphery of the reel mount is shorter than a second distance from the abutting point to said engaging portion of said brake member.

8. A reel braking device according to claim 6, wherein the sliding portion and the engaged portion of the outer periphery of the reel mount are a cylindrical portion and a gear portion, respectively, and said engaging portion of said brake member is a pawl portion.

9. A recording and/or reproducing apparatus comprising said reel braking device according to claim 6, a rotary drum having a head for recording and/or reproduction, tape loading means for pulling a tape out of a cassette, a first chassis on which at least said rotary drum is disposed, and a second chassis on which at least the reel mount and said brake member are disposed and which is arranged to be slidable relatively with respect to said first chassis, wherein, after the cassette is mounted on the reel mount on said second chassis, said second chassis is slid toward said rotary drum relatively with respect to said first chassis, and the tape is pulled out of the cassette by said tape loading means so that the tape is loaded onto a predetermined path including a circumferential surface of said rotary drum.

10. A reel braking device comprising:

(a) a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount and a guide slot formed near the center of the approximately circular arc form of said abutting contact portion and extending approximately radially of said abutting contact portion, said guide slot of said brake member being engaged with and supported by a guide shaft provided on a chassis on which the reel mount is disposed, so that said brake member is arranged to be rotatable on the chassis and to be slidably movable toward the reel mount;

(b) an urging member provided separately from said brake member and arranged to urge said brake member so as to move said brake member toward the reel mount, said urging member being extended between said brake member and said guide shaft; and wherein a height of a position above the chassis where said urging member abuts on said guide shaft is set approximately equal to a height of a position above the chassis where said abutting contact portion of said brake member is brought into abutting contact with the sliding portion of the outer periphery of the reel mount.

11. A reel braking device comprising:

(a) a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount and a guide slot formed near the center of the approximately circular arc form of said abutting contact portion and extending approximately radially of said abutting contact portion, said guide slot of said brake member being engaged with and supported by a guide shaft provided on a chassis on which the reel mount is disposed, so that said brake member is arranged to be rotatable on the chassis and to be slidably movable toward the reel mount;

(b) an urging member provided separately from said brake member and arranged to urge said brake member so as to move said brake member toward the reel mount, said urging member being extended between said brake member and said guide shaft; and wherein a height of position above the chassis where said urging member abuts on said guide shaft is set greater than a height of a position above the chassis where said abutting contact portion of said brake member is brought into abutting contact with the sliding portion of the outer periphery of the reel mount.

12. A reel braking device comprising:

(a) a one-piece brake member integrally formed a contact portion capable of contacting with a portion of an outer periphery of a reel mount, and an engaging portion capable of engaging with an engaged portion of the outer periphery of the reel mount, said brake member rotatably supported on a chassis and slidably supported in a direction which said brake member contacts said contact portion to said portion of the outer periphery of the reel mount or separates said contact portion from said portion of the outer periphery of the reel mount; and (b) an urging member to urge said brake member so as to effect the sliding movement of said brake member.

13. A reel braking device according to claim 12, wherein said brake member is a molded plastic body.

14. A reel braking device comprising:

(a) a one-piece member having an abutting contact portion capable of coming into abutting contact with a portion of an outer periphery of a reel mount, and an engaging portion capable of engaging with an engaged portion of the outer periphery of the reel mount, said brake member being rotatable and slidably movable relative to the reel mount;

(b) an urging member provided separately from said brake member and arranged to urge said brake member so as to effect the sliding movement of said brake member;

(c) a shaft member; and wherein said brake member includes a slot therethrough, said shaft member being resident in said slot, said slot having a length dimension exceeding the diameter of said shaft member to permit the sliding movement of said brake member.

15. A reel braking device comprising:

(a) a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount and a guide slot formed near the center of the approximately circular arc form of said abutting contact portion and extending approximately radially of said abutting contact portion, said guide slot of said brake member being engaged with and supported by a guide shaft provided on a chassis on which the reel mount is disposed, so that said brake member is arranged to be rotatable on the chassis and movable toward the reel mount; and (b) an urging member provided separately from said brake member and arranged to urge said brake member so as to move said brake member toward the reel mount, said urging member being extended between said brake member and said guide shaft, wherein a height of a position above the chassis where said urging member abuts on said guide shaft is set approximately equal to a height of a position above the chassis where said abutting contact portion of said brake member is brought into abutting contact with the sliding portion of the outer periphery of the reel mount.

16. A reel braking device comprising:

(a) a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount and a guide slot formed near the center of the approximately circular arc form of said abutting contact portion and extending approximately radially of said abutting contact portion, said guide slot of said brake member being engaged with and supported by a guide shaft provided on a chassis on which the reel mount is disposed, so that said brake member is arranged to be rotatable on the chassis and movable toward the reel mount; and (b) an urging member provided separately from said brake member and arranged to urge said brake member so as to move said brake member toward the reel mount, said urging member being extended between said brake member and said guide shaft, wherein a height of a position above the chassis where said urging member abuts on said guide shaft is set greater than a height of a position above the chassis where said abutting contact portion of said brake member is brought into abutting contact with the sliding portion of the outer periphery of the reel mount.

17. A reel braking device comprising:

(a) a brake member integrally provided with an abutting contact portion having an approximately circular arc form and capable of coming into abutting contact with a sliding portion of an outer periphery of a reel mount, and an engaging portion capable of engaging with an engaged portion of the outer periphery of the reel mount and a guide slot formed near the center of the approximately circular arc form of said abutting contact portion and extending approximately radially of said abutting contact portion, said guide slot of said brake member being engaged with and supported by a guide shaft provided on a chassis on which the reel mount is disposed, so that said brake member is arranged to be rotatable on the chassis and movable toward the reel mount; and (b) an urging member provided separately from said brake member and arranged to urge said brake member so as to move said brake member toward the reel mount, said urging member being extended between said brake member and said guide shaft, wherein said reel braking device is utilized in a recording and/or reproducing apparatus including a rotary drum having a head for recording and/or reproduction, a tape loading means for pulling a tape out of a cassette and wherein the urging member abuts the guide shaft and a clearance between the guide slot and the guide shaft permits the engaging portion of said brake member and the engaging portion of said reel mount to engage.

* * * * *

UNITED STATES PATENT AND TRADEMARK OFFICE
CERTIFICATE OF CORRECTION

PATENT NO. : 6,125,002
DATED : September 26, 2000
INVENTOR(S) : Junji Kobayashi

It is certified that error appears in the above-identified patent and that said Letters Patent is hereby corrected as shown below:

<u>Column 5,</u>
Line 3, delete "$i<j$" and insert -- $i>j$ --.

<u>Column 6,</u>
Line 47, delete "for" and insert -- for --.

Signed and Sealed this

Eighteenth Day of December, 2001

*Attest:*

*Attesting Officer*

JAMES E. ROGAN
*Director of the United States Patent and Trademark Office*